US012568026B2

(12) United States Patent
Li et al.

(10) Patent No.: US 12,568,026 B2
(45) Date of Patent: Mar. 3, 2026

(54) METHOD FOR SCHEDULING MOBILE EDGE COMPUTING-ORIENTED DISTRIBUTED DEDICATED PROTECTION SERVICES

(71) Applicant: SOOCHOW UNIVERSITY, Suzhou (CN)

(72) Inventors: Yongcheng Li, Suzhou (CN); Hongmei Zong, Suzhou (CN); Gangxiang Shen, Suzhou (CN); Jiemin Lin, Suzhou (CN)

(73) Assignee: SOOCHOW UNIVERSITY, Suzhou (CN)

( * ) Notice: Subject to any disclaimer, the term of this patent is extended or adjusted under 35 U.S.C. 154(b) by 355 days.

(21) Appl. No.: 18/195,591

(22) Filed: May 10, 2023

(65) Prior Publication Data

US 2023/0283527 A1     Sep. 7, 2023

Related U.S. Application Data

(63) Continuation of application No. PCT/CN2022/089422, filed on Apr. 27, 2022.

(30) Foreign Application Priority Data

Jun. 11, 2021     (CN) .......................... 202110656893.5

(51) Int. Cl.
*H04L 41/142* (2022.01)
*H04L 41/14* (2022.01)
(Continued)

(52) U.S. Cl.
CPC .......... *H04L 41/142* (2013.01); *H04L 41/145* (2013.01); *H04L 47/6225* (2013.01); *H04L 67/62* (2022.05)

(58) Field of Classification Search
None
See application file for complete search history.

(56) References Cited

U.S. PATENT DOCUMENTS

2011/0090805 A1*   4/2011   Chen ...................... H04L 47/60
                                                             370/252
2021/0144517 A1*   5/2021   Guim Bernat ........ G06F 9/5072

FOREIGN PATENT DOCUMENTS

CN          108304250 A      7/2018
CN          111770477 A      10/2020
            (Continued)

OTHER PUBLICATIONS

Tong Wang, "Protection Strategies for Mobile Edge Computing Network" Master Degree's Thesis, Soochow University (Feb. 15, 2021).

*Primary Examiner* — Jae Y Lee
*Assistant Examiner* — Nam P. Cao
(74) *Attorney, Agent, or Firm* — SZDC Law PC

(57)          ABSTRACT

The invention provides a method and system for scheduling a mobile edge computing-oriented distributed dedicated protection service. The method includes: dividing a service into subservices and generating corresponding protection subservices; and simultaneously selecting a working server for a subservice and selecting a MEC server for a protection subservice by using a double round-robin scheduling policy, where the server selected for the subservice is different from the server selected for the protection subservice. The system includes a large-scale network formed by MEC servers, where services and dedicated protection services corresponding to the services are arranged on the MEC servers by the above method. A total delay of a service is minimized on the premise of protecting the service, thereby avoiding a waste of computing resources or overloading, and implementing the division of mobile edge computing-oriented (Continued)

distributed services and the joint optimization of computing resources and protection computing resources of subservices.

9 Claims, 7 Drawing Sheets

(51) Int. Cl.
H04L 47/62 (2022.01)
H04L 67/62 (2022.01)

(56) References Cited

FOREIGN PATENT DOCUMENTS

| CN | 112888005 | A | 6/2021 |
| CN | 113179331 | A | 7/2021 |

* cited by examiner

METHOD FOR SCHEDULING MOBILE EDGE COMPUTING-ORIENTED DISTRIBUTED DEDICATED PROTECTION SERVICES

This application is a Continuation Application of PCT/CN2022/089422, filed on Apr. 27, 2022, which claims priority to Chinse patent application No. 202110656893.5, filed on Jun. 11, 2021, which is incorporated by reference for all purposes as if fully set forth herein.

FIELD OF THE INVENTION

The present invention relates to the field of mobile communication technologies, and in particular, to a method for scheduling a mobile edge computing-oriented distributed dedicated protection service.

DESCRIPTION OF THE RELATED ART

Mobile edge computing (MEC) may provide services and cloud computing functions required for the IT of telecommunication subscribers in close proximity by using a wireless access network, creating a carrier-grade service environment with high performance, low latency, and high bandwidth, increasing the download speed of content, services, and applications in the network, and allowing consumers to enjoy an uninterrupted high-quality network experience. At this stage, resource requests are sent to MEC servers in more and more resource-intensive and delay-sensitive emerging applications such as face recognition, virtual/augmented reality, and online videos. To avoid server overloading and greatly increased delays caused by a large number of concurrent services, it is necessary to study how to divide such resource-intensive and delay-sensitive services into multiple subservices with lower resource requirements and deploy the subservices in a distributed manner on multiple adjacent MEC servers for parallel processing.

Unlike conventional distributed services, MEC-oriented distributed services are often involved in daily life and production and require very short delays and high survivability, requiring research in various aspects such as service division, computation offloading, and service protection. Existing research either focuses on edge caching, computation offloading, and resource allocation problems of MEC or focuses only on distributed service scheduling problems in conventional distributed systems, with few studies on distributed dedicated protection service scheduling problems for MEC. The vast majority of studies are on distributed service scheduling in conventional distributed systems, and the purpose of such service scheduling is to minimize a transmission delay and total system energy consumption, without taking into consideration the distributed service scheduling problem in MEC networks, and without considering the problems of service division and joint optimization of computing resources and protection computing resources.

SUMMARY OF THE INVENTION

For this, a technical problem to be resolved by the present invention is to overcome disadvantages in the prior art, and provide a method for scheduling a mobile edge computing-oriented distributed dedicated protection service, so that a total delay of a service in a network can be minimized on the premise of protecting the service.

To resolve the foregoing technical problems, the present invention provides a method for scheduling a mobile edge computing-oriented distributed dedicated protection service, including:

acquiring a to-be-processed service list and a deployable resource list on a MEC sever in a network, dividing a service into a plurality of subservices, and generating protection subservices corresponding to the plurality of subservices; and simultaneously selecting a MEC server as a working server for a subservice and selecting a MEC server as a working server for a protection subservice by using a double round-robin scheduling policy, where the MEC server selected for the subservice is different from the MEC server selected for the protection subservice.

Preferably, a specific process of using the double round-robin scheduling policy is:

S1: for any service u in a service set, determining M MEC servers closest to the service u and adding the M MEC servers to an available server set $E_u$;

S2: dividing the service u to generate a subservice list $K_u$, and generating a protection subservice list $P_u$ corresponding to the subservice list $K_u$; and sequentially selecting a MEC server from the set $E_u$ as a working server for each sub service in the subservice list $K_u$;

S3: at a $j^{th}$ time slot, determining whether an $i^{th}$ computing resource on an $m^{th}$ MEC server is idle, and if yes, allocating the $i^{th}$ computing resource on the $m^{th}$ MEC server to a subservice in the service u, or if not, determining whether an $i^{th}$ computing resource on an (m+1)th server is idle, until an idle computing resource is found and allocated to the subservice in the service u;

S4: determining whether a protection subservice is established on another MEC server for a subservice deployed on the $m^{th}$ MEC server, and if yes, directly allocating a protection computing resource in a round-robin manner on a corresponding server deployed with the protection subservice, or if not, determining a protection server in a round-robin manner, and allocating a protection computing resource;

S5: determining whether i computing resources on a working server other than the $m^{th}$ MEC server are all occupied, and if yes, letting i++, and determining again whether i computing resources on a working server other than the $m^{th}$ MEC server are all occupied, or if not, allocating the i computing resources on the working server other than the $m^{th}$ MEC server to the subservice in the service u;

S6: determining whether available computing resources on all working servers can meet computing resource and protection resource requirements of all subservices in the service u within the time slot j, and if yes, performing S7, or if not, letting j++, and returning to perform S3; and S7: stopping allocation, and completing computation and protection of all services, where in this case, a delay $T_u$, of the service u is j, and it is obtained that a completion time of services in an entire network is $T_{max}=\max\{T_u\}$.

Preferably, a method used to determine the M MEC servers closest to the service u in S1 is a shortest routing algorithm.

Preferably, the round-robin manner in S4 is a service scheduling policy based on round-robin division.

Preferably, a specific process of using the service scheduling policy based on round-robin division is:

step C1: for any service in a service set, determining M MEC servers closest to the current service according to a shortest routing algorithm, and adding the determined M servers to the available MEC server set $E_u$;

step C2: for any service in the available MEC server set, determining whether a $j^{th}$ computing resource of a MEC server at a moment i is idle, and if yes, allocating the computing resource to the service in step C1, or if not, terminating allocation;

step C3: counting resources allocated to services deployed on each MEC server in the available MEC server set as a size of a subservice; and step C4: determining a start time and an end time of each service, and calculating a completion time $T_u$, of all services.

Preferably, the method further includes: constructing an integer linear programming optimization model, wherein the integer linear programming optimization model is established with a target of minimizing a service delay, and the double round-robin scheduling policy is established based on the integer linear programming optimization model.

Preferably, when the integer linear programming optimization model is established with a target of minimizing a service delay, U is defined as a service set in a network, E is a MEC node set in the network, $K_u$ is a subservice set of the service u, $E_u$, is an available MEC node set of the service u, and TS is an available time slot set; $R_u$ is a MEC computing resource required for the service u, $u \in U$, $V_m$ is a total MEC computing resource that can be provided on a MEC server m, and $\Delta$ is a preset maximum value; $a_{m,t}^{u,k}$ is a binary variable, and is 1 when the MEC server m is selected as a computing node of a sub service k of the service u at a moment t, or otherwise is 0; $b_m^{u,k}$ is a binary variable, and is 1 when the MEC server m is selected as a u computing node of the subservice k of the service u, or otherwise is 0; $s_{m,t}^{u,k}$ is an integer variable, representing a computing resource provided by the MEC server m to the subservice k of the service u at the moment t; $Z_u^{k}$ is an integer variable, and is a MEC computing resource required for the $k^{th}$ subservice of the service u after division; $ap_{m,t}^{u,k}$ is a binary variable, and is 1 when the MEC server m is selected as a computing node of a protection service of the subservice k of the service u at the moment t, or otherwise is 0; $P_u^{k}$ is a MEC protection computing resource required for the subservice k of the service u; $sp_m^{u,k}$ is a computing resource provided by the MEC server m to the protection service of the sub service k of the service u at the moment t; and $T_{max}$ is an integer variable, used for representing the completion time of all services; and it is obtained that an optimization target is to minimize a service delay to minimize: $T_{max}$.

Preferably, when the integer linear programming optimization model is established with a target of minimizing a service delay, a constraint of the integer linear programming optimization model includes a service constraint, a MEC server capacity constraint, a delay constraint, and a service protection constraint;

the service constraint includes: a sum of computing resources required for subservices is equal to resources required for a service, an amount of resources allocated by each server to a subservice on the server is equal to an amount of computing resources that needs to be carried by the subservice, and subservices need to be deployed on different servers for processing;

the MEC server capacity constraint includes: a total sum of computing resources used on each MEC server cannot exceed a maximum amount of available computing resources of the MEC server;

the delay constraint includes: a total delay of completing a service cannot exceed a maximum number of time slots; and the service protection constraint includes: a total sum of computing resources required for a protected subservice is equal to a total sum of computing resources required for a protection subservice, and the protected subservice and the corresponding protection subservice are respectively deployed on different MEC servers.

Preferably, an expression of the service constraint is:

$b_m^{u,k} \geq a_{m,t}^{u,k} \forall u \in U$, $k \in K_u$, $m \in E_u$, $t \in TS$, representing that each subservice k of the service u can only be deployed on one MEC server;

$\Sigma_{k \in K_u} b_m^{u,k} \leq 1$ $\forall u \in U$, $k \in K_u$, $m \in E_u$, representing that one MEC server cannot simultaneously serve any two subservices of the service u;

$a_{m1,t1}^{u,k} + a_{m2,t2}^{u,k} \leq 1$ $\forall \in U$, $k \in K_u$, m1, m2 $\in E_u$, t1, t2 $\in TS$, representing that any two subservices of the service u need to be deployed on different servers for processing;

$s_{m,t}^{u,k} \leq \Delta \cdot a_{m,t}^{u,k} \forall u \in U$, $k \in K_u$, $m \in E_u$, $t \in TS$, representing that after the MEC server m provides a computing resource to the subservice k of the service u, the server m is selected as a computing node of the subservice k; and $\Sigma_{k \in K_u} Z_u^{k} = R_u$ $\forall u \in U$, $k \in K_u$, $\Sigma_{m \in E, t \in TS} s_{m,t}^{u,k} = Z_u^{k}$ $\forall u \in U$, $k \in K_u$, $m \in E_u$, $t \in TS$, representing that a total sum of computing resources provided by the server m to the subservice k of the service u is equal to computing resources required for the subservice k, and an amount of computing resources of all subservices k is equal to a required amount of computing resources of the service u;

an expression of the MEC server capacity constraint is:

$\Sigma_{u \in U, k \in K_u} (s_{m,t}^{u,k} + sp_{m,t}^{u,k}) \leq V_m$ $\forall u \in U$, $k \in K_u$, $m \in E_u$, $t \in TS$, representing that at any moment t, a sum of computing resources and protection computing resources provided by a MEC server to a subservice cannot exceed a maximum value of available computing resources of the MEC server;

an expression of the delay constraint is:

$T \geq t \cdot a_{m,t}^{u,k} \not\in u \in U$, $k \in K_u$, $m \in E_u$, $t \in TS$, representing calculating a time at which all the services have been processed, where the time cannot be earlier than an end time of any service in a MEC network; and $T \geq t \cdot ap_{m,t}^{u,k} \forall u \in U$, $k \in K_u$, $m \in E_u$, $t \in TS$, representing calculating a time at which all the services have been processed, where the time at which all the services have been processed is not earlier than an end time of any service in the MEC network, including a time of service protection; and an expression of the service protection constraint is:

$ap_{m1,t1}^{u,k} + ap_{m2,t2}^{u,k} \leq 1$ $\forall \in U$, $k \in K_u$, m1, m2 $\in E_u$, t1, t2 $\in TS$, $sp_{m,t}^{u,k} \leq \Delta \cdot ap_{m,t}^{u,k} \forall u \in U$, $k \in K_u$, $m \in E_u$, $t \in TS$, representing that none of protection services can be scheduled on the same server as a protected service, and only the same MEC server can provide a computing resource to each protection subservice; and $\Sigma_{u \in U, k \in K_u} P_u^{k} = R_u$ $\forall u \in U$, $k \in K_u$, $\Sigma_{m \in E, t \in TS} sp_{m,k}^{u,k} = P_{m,t}^{u}$, $_k \forall u \in U$, $k \in K_u$, $m \in E_u$, $t \in TS$, and $Z_u^{k} = p_u^{k} \forall u \in U$, $k \in K_u$ representing that a protection subservice and a protected subservice have an identical division form.

The present invention further provides a system for scheduling a mobile edge computing-oriented distributed dedicated protection service, including a large-scale network formed by MEC servers, where services and dedicated protection services corresponding to the services are arranged on the MEC servers by using the method for scheduling a mobile edge computing-oriented distributed dedicated protection service.

Compared with the prior art, the foregoing technical solution of the present invention has the following advantages:

In the method for scheduling a mobile edge computing-oriented distributed dedicated protection service of the present invention, a double round-robin scheduling policy is used, and actual available computing resources on a server are considered, so that a total delay of a service in a network is minimized on the premise of protecting the service, thereby avoiding a waste of computing resources or overloading on a MEC server, and implementing the division of mobile edge computing-oriented distributed services and the joint optimization of computing resources and protection computing resources of sub services.

BRIEF DESCRIPTION OF THE DRAWINGS

To make the content of the present invention clearer and more comprehensible, the present invention is further described in detail below according to specific embodiments of the present invention and the accompanying drawings.

DETAILED DESCRIPTION OF THE PREFERRED EMBODIMENTS

The present invention is further described below with reference to the accompanying drawings and specific embodiments, to enable a person skilled in the art to better understand and implement the present invention. However, the embodiments are not used to limit the present invention.

In the description of the present invention, it needs to be understood that the term "include" is intended to cover a non-exclusive inclusion. For example, a process, method, system, product or device that includes a series of steps or units not only includes those specified steps or units, but optionally further includes steps or units that are not specified, or optionally further includes other steps or units that are inherent to these processes, methods, products or devices.

An embodiment of a method for scheduling a mobile edge computing-oriented distributed dedicated protection service in the present invention includes the following steps.

Step 1: Acquire a to-be-processed service list and a deployable resource list on a MEC sever in a network, divide a service into a plurality of subservices, and generate protection subservices corresponding to the plurality of subservices.

A service is divided into a plurality of subservices, and protection subservices corresponding to the plurality of subservices are generated. A protection subservice may be understood as a backup for a subservice. When an original subservice is abnormal, the protection subservice may be used to complete a task to ensure that a service can be completed with a success rate of 100%.

Step 2: Simultaneously select a MEC server as a working server for a subservice and select a MEC server as a working server for a protection subservice by using a double round-robin scheduling policy, where the MEC server selected for the subservice is different from the MEC server selected for the protection subservice.

Figure 4:
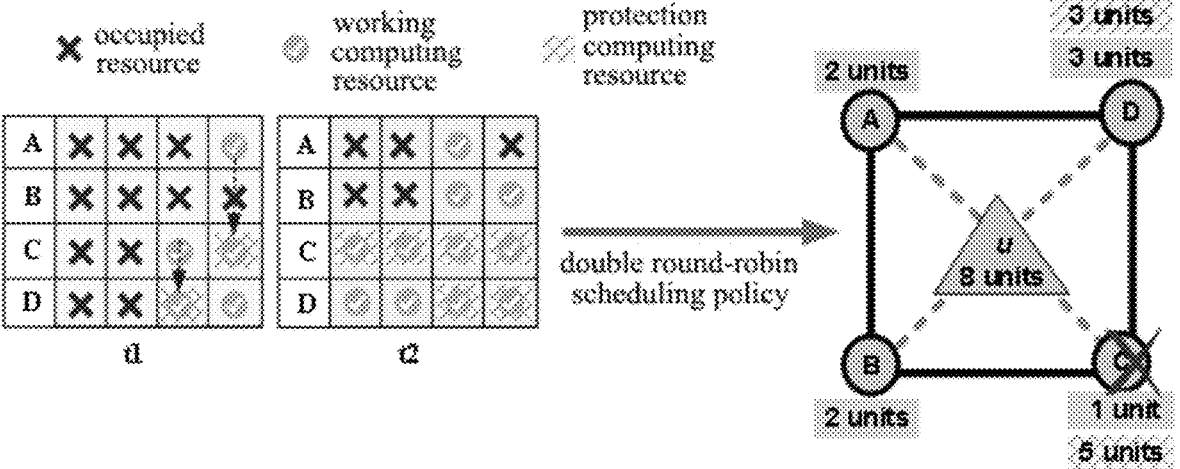
FIG. 4 is an exemplary diagram of a double round-robin scheduling policy according to an embodiment of the present invention.

The main concept of the double round-robin scheduling policy is to simultaneously select a working server for a subservice and select a protection server in a round-robin manner. As shown in the example in FIG. 4, it is assumed that there is one distributed service u on one MEC node. Available MEC servers of the distributed service include A on a local node and B, C, and D on adjacent nodes. An available computing resource of each MEC server within a unit time t is 4 units. It is assumed that a MEC computing resource required for the distributed service u is 8 units, and the available servers are A, B, C, and D. As can be seen from FIG. 4, when the double round-robin scheduling policy is used, the first working computing resource is first deployed on the server C in a round-robin manner, and then a protection computing resource is set for the working computing resource. If a protection subservice has not been established on another MEC server for a subservice of the service on the MEC server C, a corresponding protection computing resource is deployed in a round-robin manner on another MEC server other than C, and a corresponding protection subservice is established. That is, a corresponding protection computing resource is deployed on the MEC server D in the figure. If a working computing resource is deployed on the MEC server C later, a corresponding protection computing resource needs to be deployed on the MEC server D. Similarly, after the second working computing resource is deployed on the MEC server A, a protection computing resource corresponding to the second working computing resource is deployed on the MEC server C, and a corresponding protection subservice is established. Sequential polling is performed in the foregoing manner, and deployment stops until working computing resources and protection computing resources deployed on the servers all meet a total amount of computing resources required for the service u. In this case, the completion of the service u is kept from being affected by a fault on any MEC server.

Figure 1:
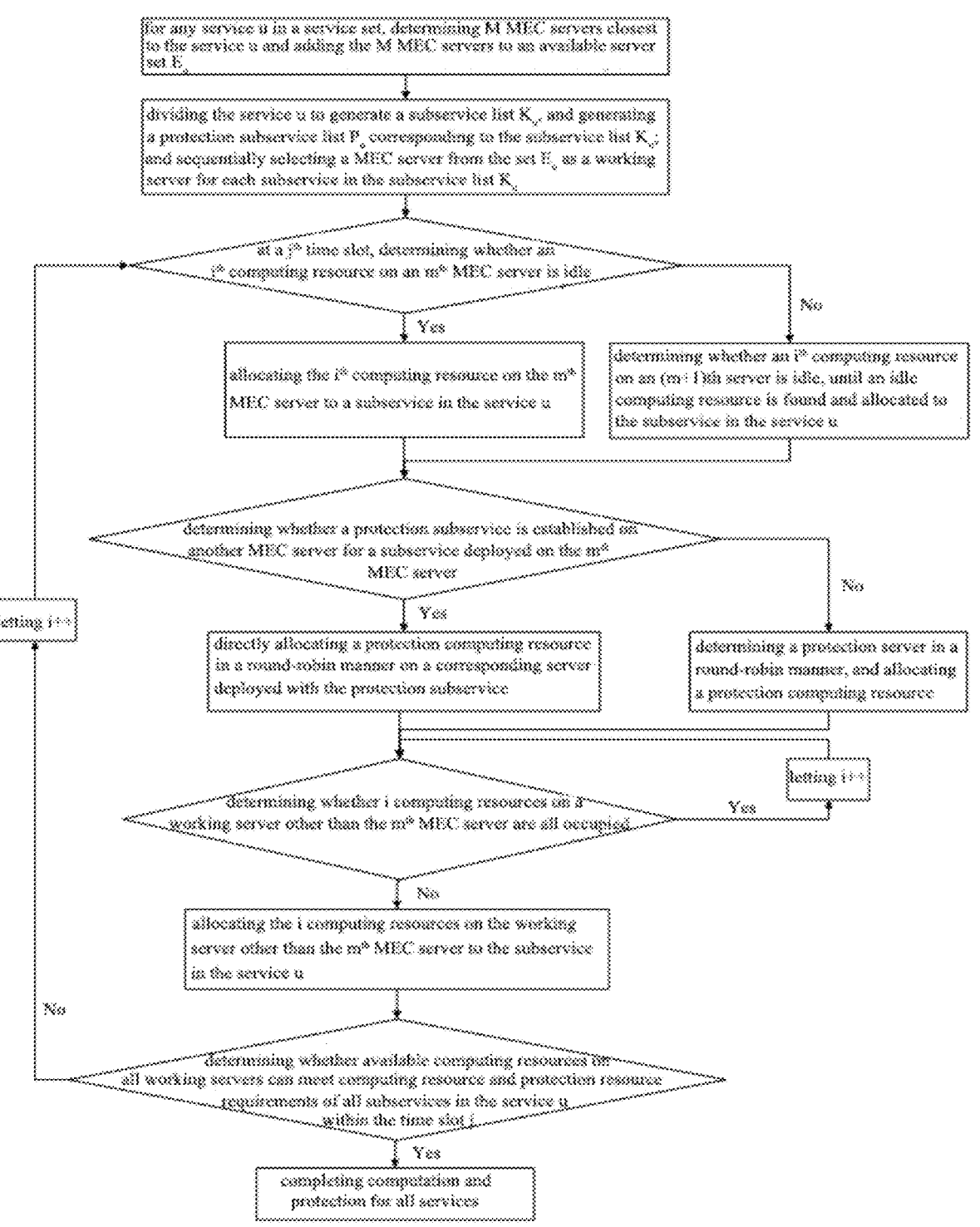
FIG. 1 is a flowchart of double round-robin scheduling policy according to the present invention.

As shown by the flowchart of the double round-robin scheduling policy in FIG. 1, a specific process of using the double round-robin scheduling policy is as follows:

S1: For any service u in a service set, determine M MEC servers closest to the service u by using a shortest routing algorithm and add the M MEC servers to an available server set E.

S2: Divide the service u to generate a subservice list $K_u$, and generate a protection subservice list $P_u$ corresponding to the subservice list $K_u$; and sequentially select a MEC server from the set $E_u$ as a working server for each subservice in the subservice list $K_u$.

S3: At a $j^{th}$ time slot, determine whether an $i^{th}$ computing resource on an $m^{th}$ MEC server is idle, and if yes, allocate the $i^{th}$ computing resource on the $m^{th}$ MEC server to a sub service in the service u, or if not, determine whether an $i^{th}$ computing resource on an $(m+1)^{th}$ server is idle, until an idle computing resource is found and allocated to the subservice in the service u.

The determining whether an $i^{th}$ computing resource on an $m^{th}$ MEC server is idle is specifically: if the $i^{th}$ computing resource is neither allocated to a subservice nor allocated to a protection subservice, determining that the $i^{th}$ computing resource is idle; and if the $i^{th}$ computing resource is allocated to a subservice or allocated to a protection subservice, determining that the $i^{th}$ computing resource is not idle.

S4: If the $i^{th}$ computing resource on the $m^{th}$ MEC server is occupied by the subservice, further deploy a protection (backup) computing resource of the computing resource; an determine whether a protection subservice is established on another MEC server for a subservice deployed on the $m^{th}$ MEC server, and if yes, directly allocate a protection computing resource in a round-robin manner on a corresponding server deployed with the protection subservice, or if not, determine a protection server in a round-robin manner, and allocate a protection computing resource.

The round-robin manner is a service scheduling policy based on round-robin division, and a specific process of using the service scheduling policy based on round-robin division is:

step C1: for any service in a service set, determining M MEC servers closest to the current service according to a shortest routing algorithm, and adding the determined M servers to the available MEC server set $E_u$;

step C2: for any service in the available MEC server set, determining whether a $j^{th}$ computing resource of a MEC server at a moment i is idle, and if yes, allocating the computing resource to the service in step C1, or if not, terminating allocation;

step C3: counting resources allocated to services deployed on each MEC server in the available MEC server set as a size of a subservice; and step C4: determining a start time and an end time of each service, and calculating a completion time $T_u$ of all services.

S5: Determine whether i computing resources on a working server other than the $m^{th}$ MEC server are all occupied, and if yes, let i++, and determine again whether i computing resources on a working server other than the $m^{th}$ MEC server are all occupied, or if not, allocate the i computing resources on the working server other than the $m^{th}$ MEC server to the subservice in the service u.

S6: Determine whether available computing resources on all working servers can meet computing resource and protection resource requirements of all subservices in the service u within the time slot j, and if yes, perform S7, or if not, let j++, and return to perform S3.

S7: Stop allocation, and complete computation and protection of all services, where in this case, a delay $T_u$ of the service u is j, and it is obtained that a completion time of services in an entire network is $T_{max}=\max\{T_u\}$.

An embodiment of a system for scheduling a mobile edge computing-oriented distributed dedicated protection service includes a large-scale network formed by MEC servers, where services and dedicated protection services corresponding to the services are arranged on the MEC servers by using the method for scheduling a mobile edge computing-oriented distributed dedicated protection service in the foregoing embodiments.

The method for scheduling a mobile edge computing-oriented distributed dedicated protection service in this embodiment further includes: constructing an integer linear programming optimization model, establishing the integer linear programming optimization model with a target of minimizing a service delay, and establishing the double round-robin scheduling policy based on the integer linear programming optimization model. In this embodiment, a MEC-oriented distributed service scheduling problem is defined: a physical MEC network topology is known, and the topology includes MEC nodes and physical links. In this specification, the MEC nodes include wireless access points and MEC servers connected to the wireless access points. Each MEC server provides a certain quantity of MEC computing resources. Network bandwidth resources provided by each physical link can ensure the deployment of a service. Available MEC nodes for the service are obtained by using a Dijkstra shortest routing algorithm. An optimization target of the problem is to minimize a total delay in completing the service.

When the integer linear programming optimization model is established with a target of minimizing a service delay, the following content is defined:

sets: U is a service set in a network, E is a MEC node set in the network, $K_u$ is a subservice set of a service u, $E_u$ is an available MEC node set for the service u, and TS is an available time slot set;

parameters: $R_u$ is a MEC computing resource required for the service u, u∈U, $V_m$ is a total MEC computing resource that can be provided on a MEC server m, it is specified in this embodiment that a fixed computing resource is reserved on each MEC server and specially used for processing a distributed service, and $\Delta$ is a preset maximum value, and is 1000000 in this embodiment;

variables: $a_{m,t}^{u,k}$ is a binary variable, and is 1 when the MEC server m is selected as a computing node of a sub service k of the service u at a moment t, or otherwise is 0; $b_m^{u,k}$ is a binary variable, and is 1 when the MEC server m is selected as a computing node of the subservice k of the service u, or otherwise is 0; $S_{m,t}^{u,k}$ is an integer variable, representing a computing resource provided by the MEC server m to the subservice k of the service u at the moment t; $Z_u^k$ is an integer variable, and is a MEC computing resource required for the $k^{th}$ subservice of the service u after division; $ap_{m,t}^{u,k}$ is a binary variable, and is 1 when the MEC server m is selected as a computing node of a protection service of the subservice k of the service u at the moment t, or otherwise is 0; $P_u^k$ is a MEC protection computing resource required for the subservice k of the service u; $sp_m^{u,k}$ is a computing resource provided by the MEC server m to the protection service of the sub service k of the service u at the moment t; and $T_{max}$ is an integer variable, used for representing the completion time of all services; and it is obtained that an optimization target is to minimize a service delay to minimize: $T_{max}$.

When the integer linear programming optimization model is established with a target of minimizing a service delay, a constraint of the integer linear programming optimization model includes (1) a service constraint, (2) a MEC server capacity constraint, (3) a delay constraint, and (4) a service protection constraint;

(1) the service constraint includes: a sum of computing resources required for subservices is equal to resources required for a service, an amount of resources allocated by each server to a subservice on the server is equal to an amount of computing resources that needs to be carried by the subservice, and subservices need to be deployed on different servers for processing;

an expression of the service constraint is:

$b_m^{u,k} \geq a_{m,t}^{u,k} \forall u \in U, k \in K_u, m \in E_u, t \in TS$, representing that each subservice k of the service u can only be deployed on one MEC server;

$\Sigma_{k \in K_u} b_m^{u,k} \leq 1 \ \forall u \in U, k \in K_u, m \in E_u$, representing that one MEC server cannot simultaneously serve any two sub-services of the service u;

$a_{m1,t1}^{u,k} + a_{m2,t2}^{u,k} \leq 1 \ \forall \in U, k \in K_u, m1, m2 \in E_u, t1, t2 \in TS$, representing that any two subservices of the service u need to be deployed on different servers for processing;

$s_{m,t}^{u,k} \leq \Delta \cdot a_{m,t}^{u,k} \forall u \in U, k \in K_u, m \in E_u, t \in TS$, representing that after the MEC server m provides a computing resource to the subservice k of the service u, the server m is selected as a computing node of the subservice k; and $\Sigma_{k \in K_u} Z_u^k = R_u \ \forall u \in U, k \in K_u, \Sigma_{m \in E, t \in TS} s_{m,t}^{u,k} = Z_u^k \ \forall u \in U, k \in K_u, m \in E_u, t \in TS$, representing that a total sum of computing resources provided by the server m to the subservice k of the service u is equal to computing resources required for the subservice k, and an amount of computing resources of all subservices k is equal to a required amount of computing resources of the service u.

(2) The MEC server capacity constraint includes: a total sum of computing resources used on each MEC server cannot exceed a maximum amount of available computing resources of the MEC server;

an expression of the MEC server capacity constraint is:

$\Sigma_{u \in U, k \in K_u}(s_{m,t}^{u,k} + sp_{m,t}^{u,k}) \leq V_m \ \forall u \in U, k \in K_u, m \in E_u, t \in TS$, representing that at any moment t, a sum of computing resources and protection computing resources provided by a MEC server to a sub service cannot exceed a maximum value of available computing resources of the MEC server.

(3) The delay constraint includes: a total delay of completing a service cannot exceed a maximum number of time slots; and an expression of the delay constraint is:

$T \geq t \cdot a_{m,t}^{u,k} \forall u \in U, k \in K_u, m \in E_u, t \in TS$, representing calculating a time at which all the services have been processed, where the time at which all the services have been processed cannot be earlier than an end time of any service in a MEC network; and $T \geq t \cdot ap_{m,t}^{u,k} \forall u \in U, k \in K_u, m \in E_u, t \in TS$, representing calculating a time at which all the services have been processed, where the time is not earlier than an end time of any service in the MEC network, including a time of service protection.

(4) The service protection constraint includes: a total sum of computing resources required for a protected subservice is equal to a total sum of computing resources required for a protection subservice, and the protected subservice and the corresponding protection subservice are respectively deployed on different MEC servers;

an expression of the service protection constraint is:

$ap_{m1,t1}^{u,k} + ap_{m2,t2}^{u,k} \leq 1 \ \forall \in U, k \in K_u, m1, m2 \in E_u, t1, t2 \in TS$, $sp_{m,t}^{u,k} \leq \Delta \cdot ap_{m,t}^{u,k} \forall u \in U, k \in K_u, m \in E_u, t \in TS$, representing that none of protection services can be scheduled on the same server as a protected service, and only the same MEC server can provide a computing resource to each protection subservice; and $\Sigma_{k \in K_u} P_u^k = R_u \ \forall u \in U, k \in K_u$,
$\Sigma_{m \in E, t \in TS} sp_{m,t}^{u,k} = P_u^k \forall u \in U, k \in K_u, m \in E_u, t \in TS$,
$Z_u^k = P_u^k \forall u \in U, k \in K_u$, representing that a protection subservice and a protected subservice have an identical division form. To further describe the beneficial effects of the present invention, in this embodiment, a simulation experiment of comparing the double round-robin scheduling policy (DS) in the present invention with a random scheduling policy (RS) and a cyclic scheduling policy (CS) is performed in two test network cases of an n6s9 network including 6 MEC nodes and 9 network links and an NSFNET network including 14 MEC nodes and 21 network links.

The core concept of the random scheduling policy is to ensure that a protected service and a protection service cannot be scheduled on one same MEC server. As shown in the example in FIG. 2, for an existing distributed service A, a MEC computing resource of 370 units is required for the distributed service A. After a service scheduling policy based on round-robin division is performed, a computing resource required for each subservice is shown as a working computing resource and a protection computing resource with a total sum of 370 in FIG. 2. Available servers required for each subservice are shown by N0, N1, N2, and N3 in FIG. 2. After service division, a protection service is scheduled. That is, a MEC server that is not connected to a protected service is randomly selected, and a protection computing resource is placed on the MEC server. Specific steps of performing service scheduling on a MEC server by using a random scheduling policy are as follows:

Step A1: Acquire a distributed service and a MEC computing resource required for the distributed service, and complete service division and node selection by using a service scheduling policy based on round-robin division. A procedure of the service scheduling policy based on round-robin division is:

step C1: for any service in a service set, determining M MEC servers closest to the current service according to a shortest routing algorithm, and adding the determined M servers to the available MEC server set $E_u$;

step C2: for any service in the available MEC server set, determining whether a $j^{th}$ computing resource of a MEC server at a moment i is idle, and if yes, allocating the computing resource to the service in step C1, or if not, that is, total resources required for the service have been reached, terminating allocation;

step C3: counting resources allocated to services deployed on each MEC server in the available MEC server set as a size of a subservice; and step C4: determining a start time and an end time of each service, and calculating a completion time T1, of all services.

Step A2: Randomly select a MEC server that is not connected to a protected service, and place a protection computing resource, to complete node selection for a protection subservice:

step A2.1: after service division is completed, generating a protection subservice list for each service;

step A2.2: for each protection subservice, eliminating a MEC server on which a subservice corresponding to the protection subservice is located from the available MEC server set, then randomly selecting an $m^{th}$ MEC server, and if the $m^{th}$ MEC server is selected, allocating a computing resource Pk u on the selected $m^{th}$ MEC server for the protection subservice, restoring a set $E_u$, and performing step A2.3;

step A2.3: determining that an available computing resource of the $m^{th}$ MEC server on an $i^{th}$ time slot is Vi m, determining whether Vi m−Pk u≥0 is valid, and if the formula is valid, indicating that the protection subservice is successfully allocated and in this case a delay $T_p$ of the protection subservice p is i, and performing step A2.4; or if the formula is not valid, letting Pk u=Vi m−Pk u and i++, that is, entering (i+1) time slots, and determining again whether the formula Vi m−Pk u≥0 is valid;

step A2.4: repeating step A2.3 until all protection subservices have been successfully allocated, to obtain a total delay $T_{pu}$=max$\{T_p\}$ in completing the protection of all protection subservices u; and step A2.5: repeating step A2.1 to step A2.4 until the protection of all services is completed, to obtain a completion time $T_{max}$=max$\{T_u+T_u\}$ of services in an entire network and output the completion time.

Figure 2:
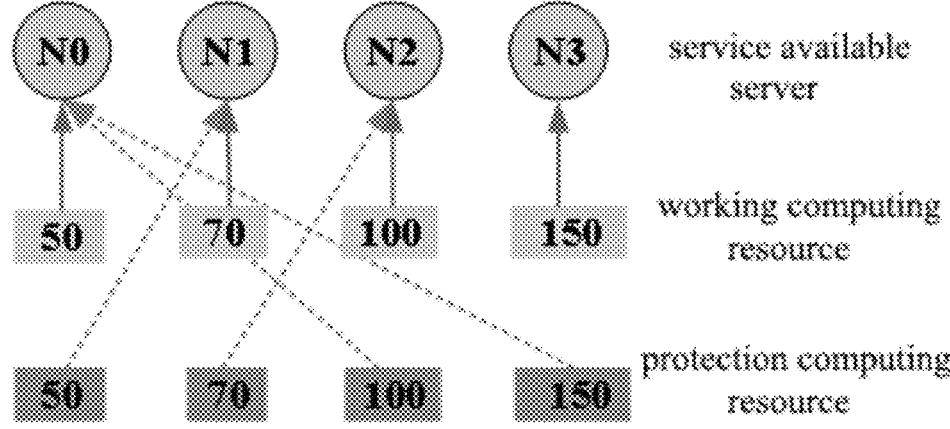
FIG. 2 is an exemplary diagram of a random scheduling policy according to an embodiment of the present invention.
Figure 3:
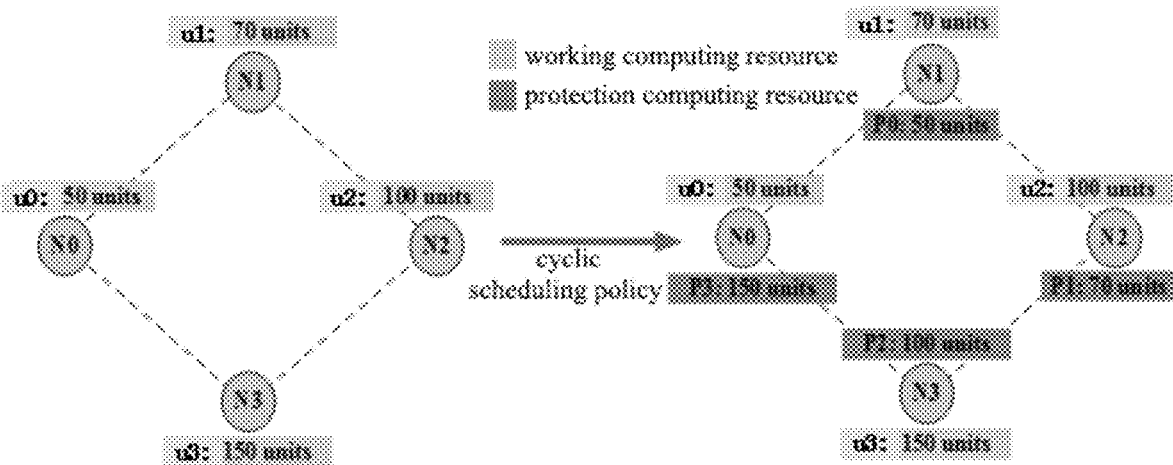
FIG. 3 is an exemplary diagram of a cyclic scheduling policy according to an embodiment of the present invention.

The core concept of the cyclic scheduling policy is to sequentially schedule protection subservices to MEC servers different from MEC servers to which protected subservices are scheduled. As shown in the example in FIG. 3, it is assumed that a MEC computing resource required for a distributed service A is 370 units. MEC servers N0, N1, N2, and N3 respectively provide computing resources and protection resources for four subservices of the service A. After the distributed service scheduling policy based on round-robin division, a computing resource required for each subservice and a respectively deployed MEC server are shown in FIG. 2. After service division, a protection subservice of each subservice is first generated. Next, the protection subservices need to be scheduled on MEC servers for processing. That is, computing resources are deployed for the protection subservices in a cyclic sequence. That is, a protection service P0 of a subservice u0 is deployed on a server N1, a protection service P1 of a subservice u1 is deployed on a server N2, and respective protection services P2 and P3 of subservices u2 and u3 are respectively deployed on servers N3 and N0. Specific steps of performing service scheduling on a MEC server by using a cyclic scheduling policy are as follows:

Step B1: Acquire a distributed service and a MEC computing resource and a protection resource required for the distributed service, and complete service division and node selection by using a service scheduling policy based on round-robin division.

Step B2: Generate a protection subservice of each subservice, and sequentially schedule protection subservices to MEC servers different from MEC servers to which protected subservices are scheduled for processing.

step B2.1: after service division is completed, generating a protection subservice list for each service;

step B2.2: traversing the protection subservice list, determining whether a current protection subservice p is the last protection subservice, and if not, selecting a $(p+1)^{th}$ MEC server to carry the protection subservice, or if yes, deploying the protection subservice on the first MEC server in the list $E_u$;

step B2.3: allocating a protection computing resource Pk u required for a $p^{th}$ protection subservice on the selected MEC server;

step B2.4: determining whether an $i^{th}$ computing resource of a selected $m^{th}$ MEC server in a time slot j is idle, and if yes, making the service u occupy the computing resource, making a computing resource of a subservice of the service u on the $m^{th}$ MEC server Pk u=Pk u+1, and performing step B2.5, or if not, letting i++, determining again whether an $i^{th}$ computing resource of a selected $m^{th}$ MEC server in a time slot j is idle;

step B2.5: determining whether computing resources allocated to the protection subservice p already reach required computing resources, and if yes, performing step B2.6, or if not, letting j++, and returning to perform step B2.4;

step B2.6: repeating step B2.4 and step B2.5 until all protection subservices have been successfully allocated, to obtain a total delay $T_{pu}$=max$\{T_p\}$ in completing the protection of all protection subservices u; and step B2.7: repeating step B2.1 to step B2.6 until the protection of all services is completed, to obtain a completion time $T_{max}$=max$\{T_u+T_{pu}\}$ of services in an entire network and output the completion time.

Figure 5:
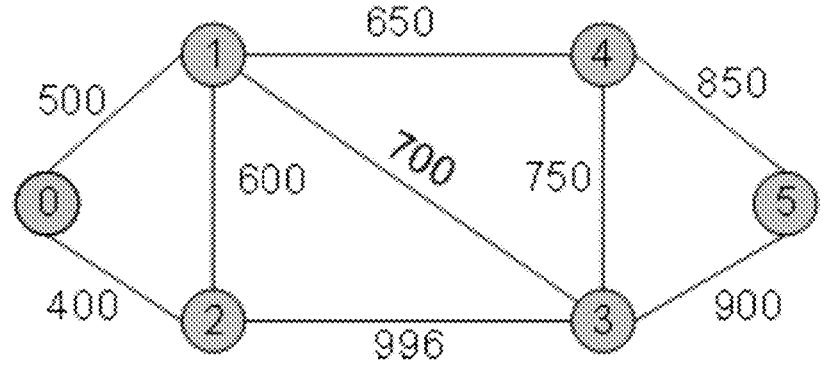
FIG. 5 is a schematic structural diagram of an n6s9 test network with 6 MEC nodes and 9 network links used in a simulation experiment according to an embodiment of the present invention.
Figure 6:
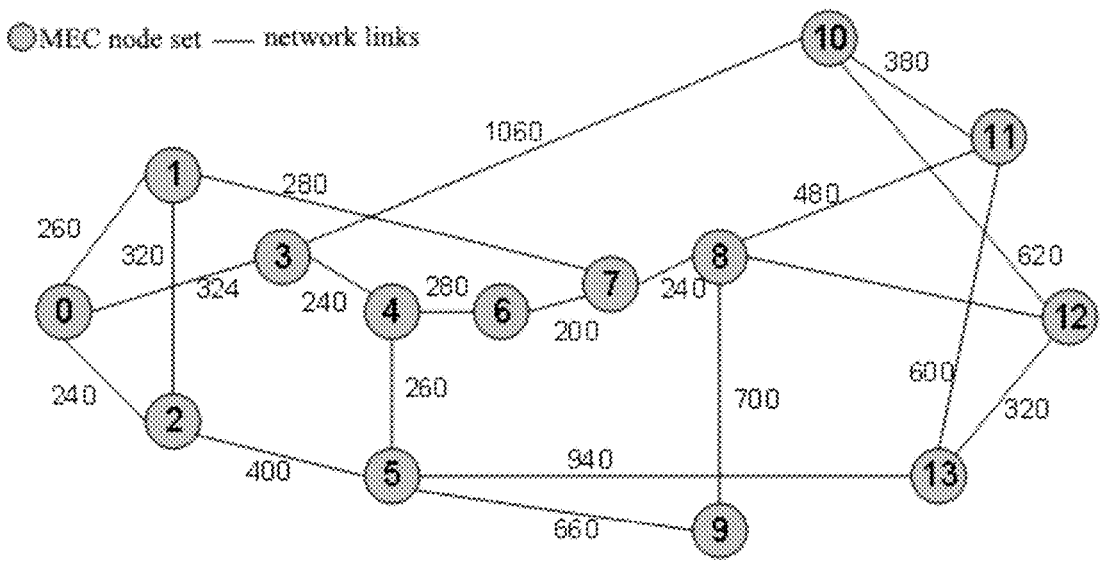
FIG. 6 is a schematic structural diagram of an NSFNET test network with 14 MEC nodes and 21 network links used in a simulation experiment according to an embodiment of the present invention.

FIG. 5 shows an n6s9 network including 6 MEC nodes and 9 network links. FIG. 6 shows an NSFNET network including 14 MEC nodes and 21 network links. A number in a link in FIG. 5 and FIG. 6 represents a physical length. In addition, it is assumed that a maximum available computing resource of each MEC server in a network is 1000 units. A computing resource required for each service on average is 400 units. A quantity of services generated on each MEC node is known. A total number of slots is set to 200 in the unit of t. A quantity of distributed services on each node is randomly generated within a certain range. Evaluation is performed respectively from three perspectives: (1) a total service delay in the network, (2) the impact of a division quantity on a total delay of a distributed dedicated protection service, and (3) load balancing of MEC servers.

(1) Evaluation from the Perspective of a Total Service Delay in the Network

Figure 7:
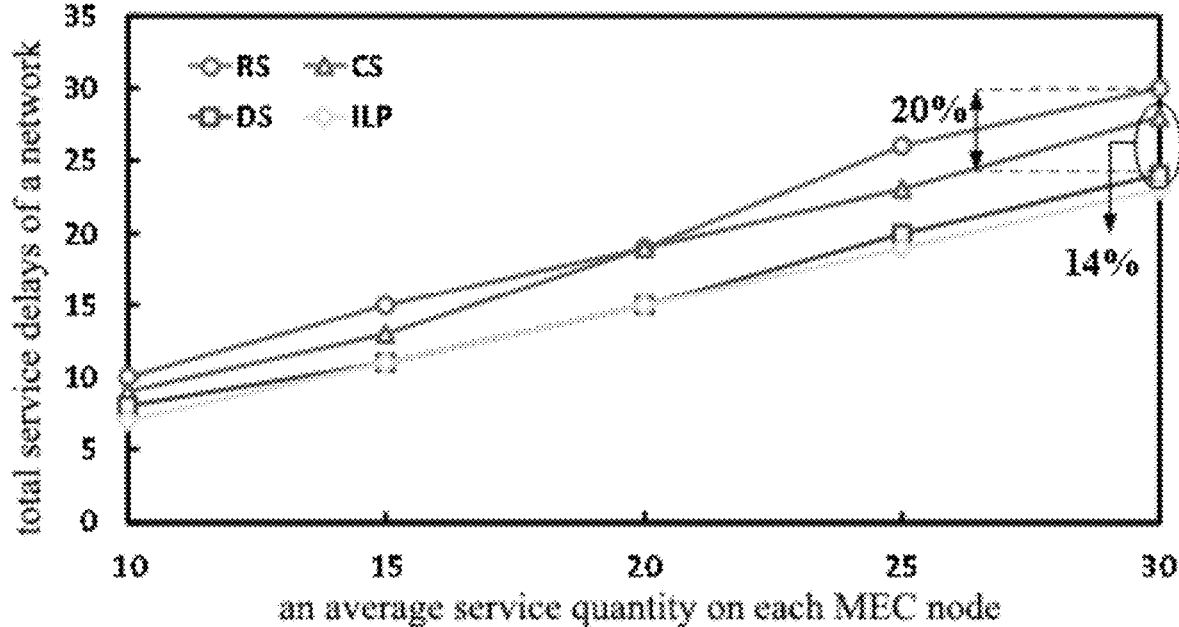
FIG. 7 is a result diagram of comparison between total service delays of a network using an ILP model, a random scheduling policy, a cyclic scheduling policy, and a double round-robin scheduling policy in an environment of an n6s9 test network in a simulation experiment according to an embodiment of the present invention.
Figure 8:
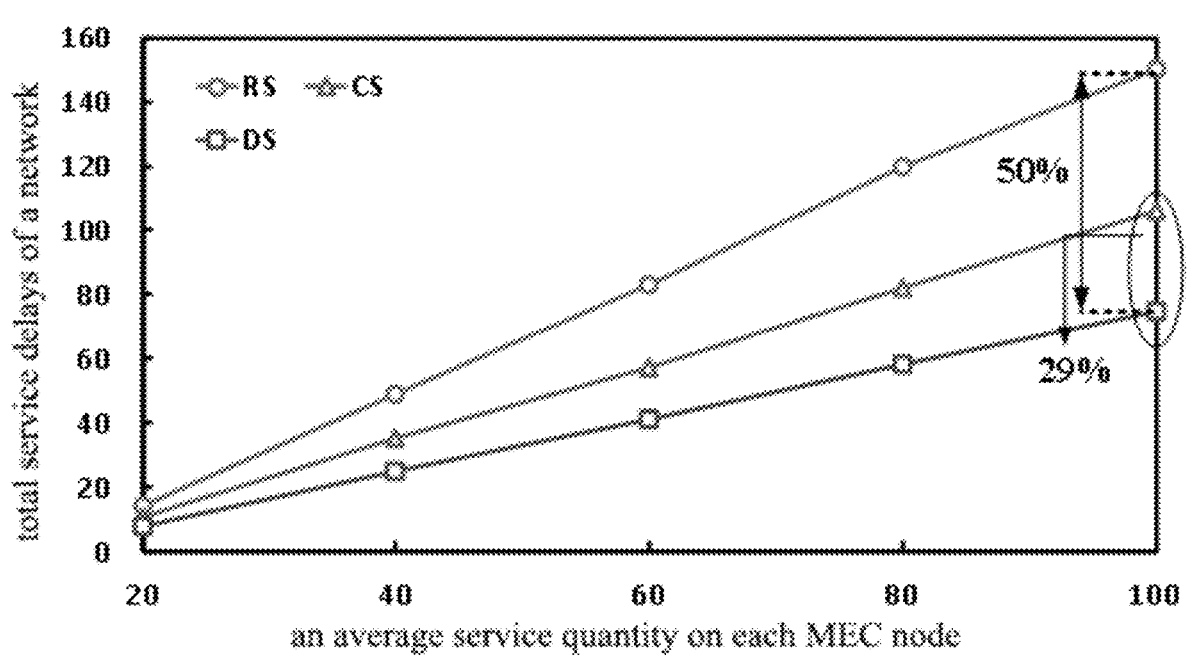
FIG. 8 is a result diagram of comparison between total service delays of a network using a random scheduling policy, a loop scheduling policy, and a double round-robin scheduling policy in an environment of an NSFNET test network in a simulation experiment according to an embodiment of the present invention.

In the environment of an n6s9 test network, a random scheduling policy (RS) method, a cyclic scheduling policy (CS) method, and a double round-robin scheduling policy (DS) method are used to compare total service delays in the network. Parameter setting: A quantity of services on each MEC node in the n6s9 network is randomly generated within a range of [X-5, X], and a quantity of services on each MEC node in the NSFNET network is randomly generated within a range of [X-20, X]. X is an average quantity of services on a MEC node. A subservice division quantity of a distributed service of each node in the network is 4. Comparison results are shown in FIG. 7. ILP in FIG. 7 represents the theoretically optical case using an integer linear programming optimization model. In the environment of an NSFNET test network, a random scheduling policy (RS), a cyclic scheduling policy (CS), and a double round-robin scheduling policy (DS) are used to compare total service delays in the network. Comparison results are shown in FIG. 8. In FIG. 7 and FIG. 8, a value on an X axis represents an average service quantity on each MEC node, and a value on a Y axis represents a total delay after all services in the network are completed.

As can be seen from FIG. 7, the double round-robin scheduling policy (DS) in the n6s9 network and the corresponding ILP optimization model have very close performance, proving the efficiency of the double round-robin scheduling policy (DS). Next, when an average service quantity on each MEC node is 30, compared with the random scheduling policy (RS) and the cyclic scheduling policy (CS), the double round-robin scheduling policy (DS) can effectively reduce a total delay in completing a service, by 20% and 14% respectively. The DS policy fully considers an available computing resource amount of a server during the allocation of a subservice protection server, to avoid a case of unbalanced load between servers when one server carries two subservices of the same service, thereby avoiding service congestion and an increase in a total service delay. Because the allocation of computing resources is an NP-hard problem, the ILP model is only applicable to solving of a small-scale problem. When a quantity of services gradually increases and a network scale gradually increases, the time complexity of the ILP model increases rapidly, making it very difficult to find an optimal solution of a large-scale service amount within a valid time range. Therefore, in the environment of the NSFNET test network, an ILP model is not used to represent a theoretically optimal case. However, as can be seen from FIG. 8, compared with the random scheduling policy (RS) and the cyclic scheduling policy (CS), the double round-robin scheduling policy (DS) reduces a total delay in completing a service by 50% and 29% respectively. This also proves the efficiency of the double round-robin scheduling policy (DS) in the aspect of minimizing a total service delay.

Figure 9:
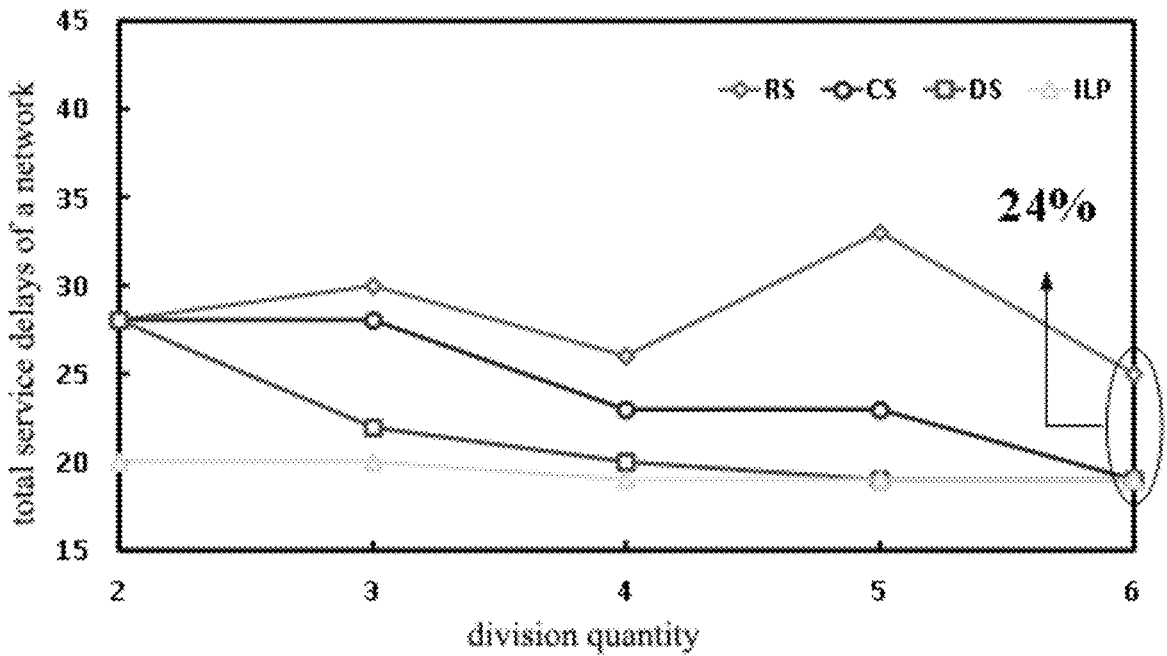
FIG. 9 is a result diagram of comparison between total service delays of a network using an ILP model, a random scheduling policy, a loop scheduling policy, and a double round-robin scheduling policy in an environment of an n6s9 test network in a simulation experiment as a division quantity increases according to an embodiment of the present invention.
Figure 10:
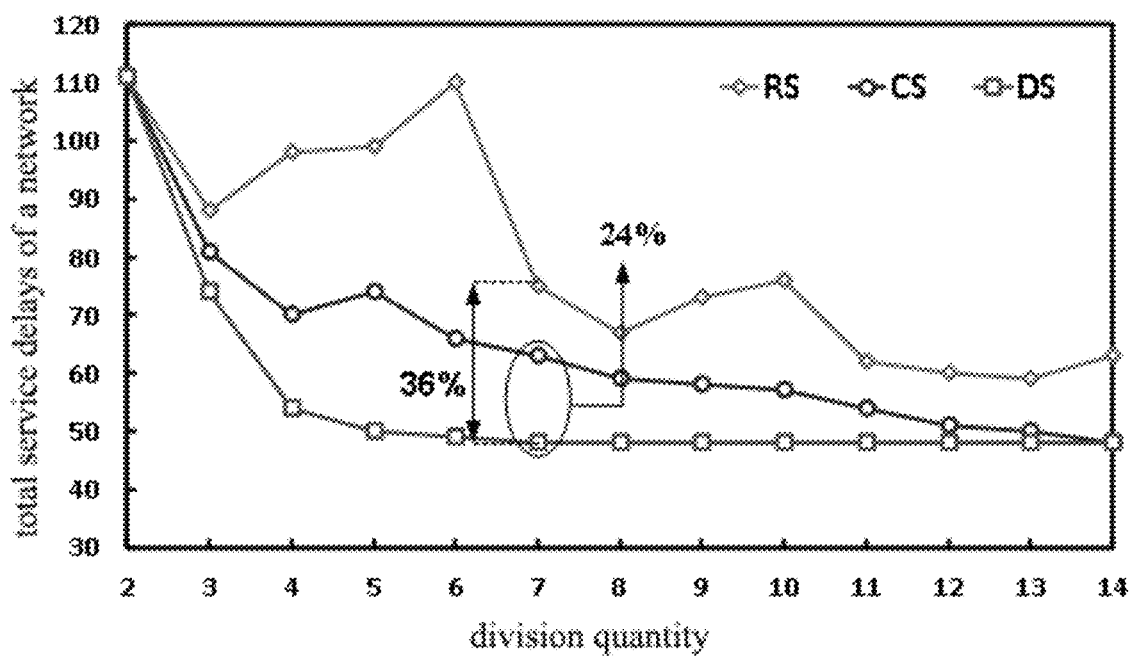
FIG. 10 is a result diagram of comparison between total service delays of a network using a random scheduling policy, a loop scheduling policy, and a double round-robin scheduling policy in an environment of an NSFNET test network in a simulation experiment as a division quantity increases according to an embodiment of the present invention.

(2) Evaluation from the Perspective of the Impact of a Division Quantity on a Total Delay of a Distributed Dedicated Protection Service In the environment of an n6s9 test network, as the division quantity increases, a random scheduling policy (RS) method, a cyclic scheduling policy (CS) method, and a double round-robin scheduling policy (DS) method are used to compare total service delays in the network, and an ILP model is used to obtain theoretically optimal values. Comparison results are shown in FIG. 9. In the environment of an NSFNET test network, as the division quantity increases, a random scheduling policy (RS), a cyclic scheduling policy (CS), and a double round-robin scheduling policy (DS) are used to compare total service delays in the network. Comparison results are shown in FIG. 10. In FIG. 9 and FIG. 10, an x axis represents the division quantity, and a y axis represents a total service delay. A quantity of services on each MEC node in the n6s9 network is randomly generated within a range of [20, 25], and a quantity of services on each MEC node in the NSFNET network is randomly generated within a range of [20, 100].

As can be seen from FIG. 9, as the division quantity increases, the result of the double round-robin scheduling policy (DS) is closer to the result of the ILP model, proving the efficiency of the double round-robin scheduling policy (DS). In addition, compared with the random scheduling policy (RS) and the cyclic scheduling policy (CS), the double round-robin scheduling policy (DS) can effectively reduce a total delay in completing a service. In addition, when a quantity of subservices is 6, a service delay obtained using the double round-robin scheduling policy (DS) is reduced by 24% compared with the random scheduling policy (RS). The reason is that the actual usage of computing resources on a MEC server is considered in the double round-robin scheduling policy (DS), to avoid a case that a lot of service requests are gathered on some MEC servers. Similarly, in the environment of an NSFNET test network, it is not appropriate to use the ILP model to represent a theoretically optimal case. However, as can be seem from FIG. 10, the service delay of the double round-robin scheduling policy (DS) is less those of the random scheduling policy (RS) and the cyclic scheduling policy (CS). In addition, when a quantity of subservices is 7, a service delay obtained using the double round-robin scheduling policy (DS) is reduced by 36% compared with the random scheduling policy (RS), and is reduced by 24% compared with the cyclic scheduling policy (CS), also proving the efficiency of the double round-robin scheduling policy (DS).

(3) Evaluation from the Perspective of Load Balancing of MEC Servers

Figure 11:
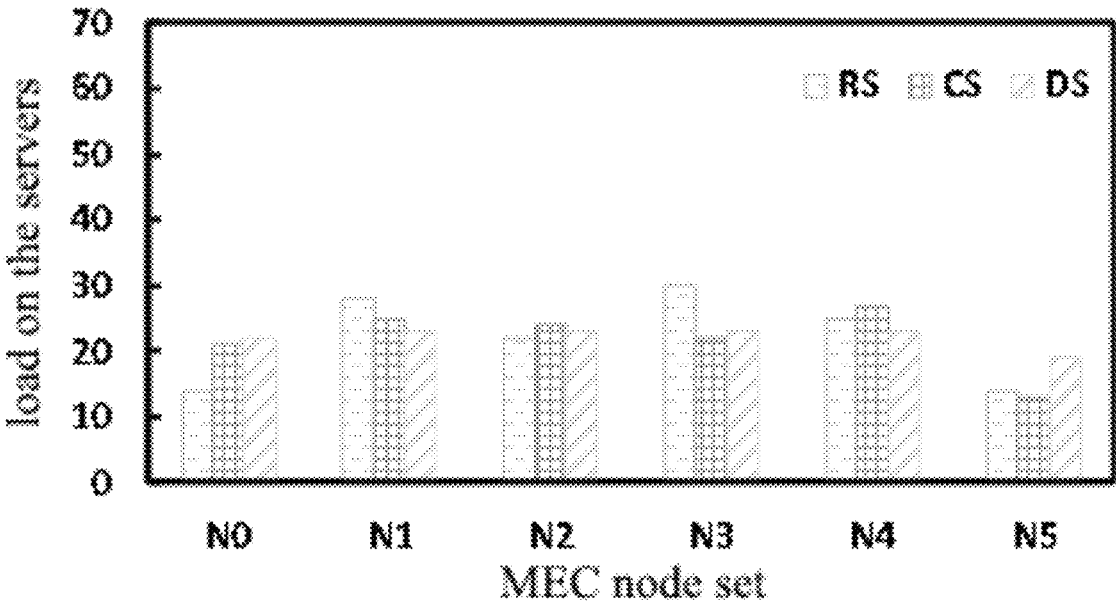
FIG. 11 is a result diagram of comparison between actual time slot occupancy on each MEC server in a network using a random scheduling policy, a loop scheduling policy, and a double round-robin scheduling policy in an environment of an n6s9 test network in a simulation experiment according to an embodiment of the present invention.
Figure 12:
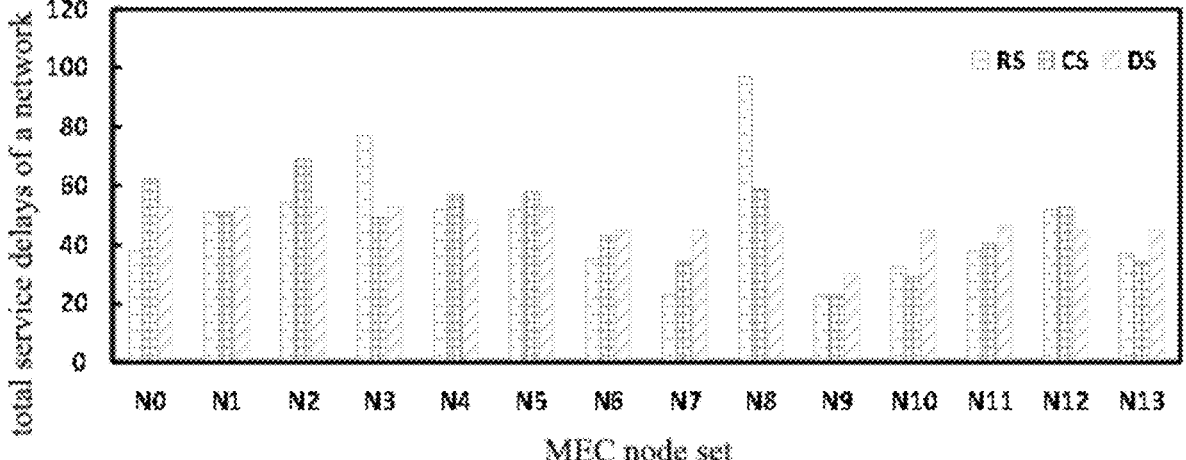
FIG. 12 is a result diagram of comparison between actual time slot occupancy on each MEC server in a network using a random scheduling policy, a loop scheduling policy, and a double round-robin scheduling policy in an environment of an NSFNET test network in a simulation experiment according to an embodiment of the present invention.

In the environment of an n6s9 test network, a random scheduling policy (RS) method, a cyclic scheduling policy (CS) method, and a double round-robin scheduling policy (DS) method are used to compare actual occupancy of time slots on each MEC server in the network. Comparison results are shown in FIG. 11. In the environment of an NSFNET test network, a random scheduling policy (RS), a cyclic scheduling policy (CS), and a double round-robin scheduling policy (DS) are used to compare actual occupancy of time slots on each MEC server in the network. Comparison results are shown in FIG. 12. In FIG. 11 and FIG. 12, an x axis represents a MEC node in a network, and a y axis represents maximum load on a server. A quantity of services on each MEC node in the n6s9 network is randomly generated within a range of [10, 50], and a quantity of services on each MEC node in the NSFNET network is randomly generated within a range of [20, 100]. The division quantity is 4. A square error formula is used as a standard for measuring load balancing between servers. When the value of a square error S2 is smaller, the load is more balanced between servers. The square error is $S^2=[(x_1-M)^2+(x_2-M)^2+(x_3-M)^2+\ldots+(x_n-M)^2]/n$, where M is an average value of the group of data, n is a quantity of pieces of data, and $x_n$ is a MEC server.

As can be seen from the simulation experiment in FIG. 11, when a service is divided into four pieces, square errors of load between servers obtained by using the random scheduling policy (RS) and the cyclic scheduling policy (CS) are respectively 6.28 and 4.47, and a square error of load between servers obtained by using the double round-robin scheduling policy (DS) is 1.48. The result proves again the efficiency of the double round-robin scheduling policy (DS) in the aspect of load balancing. FIG. 12 also gives the impact of two policies on server load in an NSFNET network. As can be seen from FIG. 12, similar to the result in an n6s9 network, square errors of load between servers obtained by using the RS policy and the CS policy are respectively 19.4 and 13.2, and a square error of load between servers obtained by using the DS policy is 5.9. The result of the double round-robin scheduling policy (DS) is always better than the results of the random scheduling policy (RS) and the cyclic scheduling policy (CS). This result proves again that the performance of the double round-robin scheduling policy (DS) is better in the aspect of load balancing. In addition, as can be further seen from FIG. 11 and FIG. 12, the load on the servers using the double round-robin scheduling policy (DS) is more balanced than that using the random scheduling policy (RS) and the cyclic scheduling policy (CS). The load on the servers using the cyclic scheduling policy (CS) is more balanced than that using the random scheduling policy (RS). The result is reasonable. Although the problem of service protection is considered in the random scheduling policy (RS), the actual load of a MEC server is not considered. It may be necessary to deploy protection resources of a plurality of subservices in one service on the same available server. As a result, the actual load on the MEC server may be excessively heavy and other servers are in an idle state, which reduces the performance of service protection. Assuming that a server on which a fault occurs is a server on which many subservices are deployed, a service interruption may occur. Compared with the random scheduling policy (RS), in the cyclic scheduling policy (CS), subservices are respectively scheduled on different MEC servers. When a server fails to process a subservice carried by the server on time, the service can be processed on a protection server, to ensure that the service is completed. Although the problem of service protection is considered in the cyclic scheduling policy (CS), the actual load of a MEC server is not considered. As a result, the actual load on a MEC server may be excessively heavy, causing severe resource contention. Compared with the cyclic scheduling policy (CS), the problem of service protection is considered in the double round-robin scheduling policy (discussed), it is ensured that the service can be completed with a success rate of 100%. In addition, load balancing between servers is also considered, to avoid service congestion.

Compared with the prior art, the foregoing technical solution of the present invention has the following advantages:

In the method for scheduling a mobile edge computing-oriented distributed dedicated protection service of the present invention, an integer linear programming optimization model is established with a target of minimizing a total service delay in a network, and a heuristic scheduling policy of a distributed dedicated protection service is established on this basis. Actual available computing resources on a server are considered, so that a total delay of a service in a network is minimized on the premise of protecting the service; in addition, a waste of computing resources or overloading on a MEC server are avoided, thereby implementing the division of mobile edge computing-oriented distributed services and the joint optimization of computing resources and protection computing resources of subservices. The problem of service protection is considered, so that it is ensured that when a fault occurs on a single MEC server in a network, a service can be completed with a success rate of 100%.

A person skilled in the art should understand that the embodiments of the present application may be provided as a method, a system or a computer program product. Therefore, the present application may use a form of hardware only embodiments, software only embodiments, or embodiments with a combination of software and hardware. Moreover, the present application may use a form of a computer program product that is implemented on one or more computer-usable storage media (including but not limited to a disk memory, a CD-ROM, an optical memory, and the like) that include computer usable program code.

The present application is described with reference to the flowcharts and/or block diagrams of the method, the device (system), and the computer program product according to the embodiments of the present application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Obviously, the foregoing embodiments are merely examples for clear description, rather than a limitation to implementations. For a person of ordinary skill in the art, other changes or variations in different forms may also be made based on the foregoing description. All implementations cannot and do not need to be exhaustively listed herein. Obvious changes or variations that are derived there from still fall within the protection scope of the invention of the present invention.

What is claimed is:

1. A method for scheduling a mobile edge computing-oriented distributed dedicated protection service, comprising:

dividing a service into a plurality of subservices, and generating protection subservices corresponding to the plurality of subservices;

simultaneously selecting a MEC server as a working server for a subservice and selecting a MEC server as a working server for a protection subservice by using a double round-robin scheduling policy, wherein the MEC server selected for the subservice is different from the MEC server selected for the protection subservice; and constructing an integer linear programming optimization model, wherein the integer linear programming optimization model is established with a target of minimizing a service delay, and the double round-robin scheduling policy is established based on the integer linear programming optimization model.

2. The method for scheduling a mobile edge computing-oriented distributed dedicated protection service according to claim 1, wherein using the double round-robin scheduling policy comprises:

S1: for any service u in a service set, determining M MEC servers closest to the service u and adding the M MEC servers to an available server set $E_u$;

S2: dividing the service u to generate a subservice list $K_u$, and generating a protection subservice list $P_u$ corresponding to the subservice list $K_u$; and sequentially selecting a MEC server from the set $E_u$ as a working server for each subservice in the subservice list $K_u$;

S3: at a $j^{th}$ time slot, determining whether an $i^{th}$ computing resource on an $m^{th}$ MEC server is idle, and if yes, allocating the $i^{th}$ computing resource on the $m^{th}$ MEC server to a subservice in the service u, or if not, determining whether an $i^{th}$ computing resource on an $(m+1)^{th}$ server is idle, until an idle computing resource is found and allocated to the subservice in the service u;

S4: determining whether a protection subservice is established on another MEC server for a subservice deployed on the $m^{th}$ MEC server, and if yes, directly allocating a protection computing resource in a round-robin manner on a corresponding server deployed with the protection subservice, or if not, determining a protection server in a round-robin manner, and allocating a protection computing resource;

S5: determining whether i computing resources on a working server other than the $m^{th}$ MEC server are all occupied, and if yes, letting i++, and determining again whether i computing resources on a working server other than the $m^{th}$ MEC server are all occupied, or if not, allocating the i computing resources on the working server other than the $m^{th}$ MEC server to the subservice in the service u;

S6: determining whether available computing resources on all working servers can meet computing resource and protection resource requirements of all subservices in the service u within the time slot j, and if yes, performing S7, or if not, letting j++, and returning to perform S3; and S7: stopping allocation, and completing computation and protection for all services, wherein in this case, a delay $T_u$ of the service u is j, and it is obtained that a completion time of services in an entire network is $T_{max} = \max \{T_u\}$.

3. The method for scheduling a mobile edge computing-oriented distributed dedicated protection service according to claim 2, wherein a method used to determine the M MEC servers closest to the service u in S1 is a shortest routing algorithm.

4. The method for scheduling a mobile edge computing-oriented distributed dedicated protection service according to claim 2, wherein a round-robin manner in S4 is a service scheduling policy based on round-robin division.

5. The method for scheduling a mobile edge computing-oriented distributed dedicated protection service according to claim 4, wherein using the service scheduling policy based on round-robin division comprises:

step C1: for any service in a service set, determining M MEC servers closest to the current service according to a shortest routing algorithm, and adding the determined M servers to the available MEC server set $E_u$;

step C2: for any service in the available MEC server set, determining whether a $j^{th}$ computing resource of a MEC server at a moment i is idle, and if yes, allocating the computing resource to the service in step C1, or if not, terminating allocation;

step C3: counting resources allocated to services deployed on each MEC server in the available MEC server set as a size of a subservice; and step C4: determining a start time and an end time of each service, and calculating a completion time $T_u$ of all services.

6. The method for scheduling a mobile edge computing-oriented distributed dedicated protection service according to claim 1, wherein when the integer linear programming optimization model is established with a target of minimizing a service delay, U is defined as a service set in a network, E is a MEC node set in the network, $K_u$ is a subservice set of the service u, $E_u$ is an available MEC node set of the service u, and TS is an available time slot set; $R_u$ is a MEC computing resource required for the service u, $u \in U$, $V_m$ is a total MEC computing resource that can be provided on a MEC server m, and $\Delta$ is a preset maximum value; $a_{m,t}^{u,k}$ is a binary variable, and $a_{m,t}^{u,k}$ is 1 when the MEC server m is selected as a computing node of a subservice k of the service u at a moment t, or otherwise is 0; $b_m^{u,k}$ is a binary variable, and $b_m^{u,k}$ is 1 when the MEC server m is selected as a computing node of the subservice k of the service u, or otherwise is 0; $S_{m,t}^{u,k}$ is an integer variable, representing a computing resource provided by the MEC server m to the subservice k of the service u at the moment t; $Z_u^k$ is an integer variable, and is a MEC computing resource required for the $k^{th}$ subservice of the service u after division $ap_{m,t}^{u,k}$ is a binary variable, and $ap_{m,t}^{u,k}$ is 1 when the MEC server m is selected as a computing node of a protection service of the subservice k of the service u at the moment t, or otherwise is 0; $P_u^k$ is a MEC protection computing resource required for the subservice k of the service u; $sp_m^{u,k}$ is a computing resource provided by the MEC server m to the protection service of the subservice k of the service u at the moment t; and $T_{max}$ is an integer variable, used for representing the completion time of all services; and it is obtained that an optimization target is to minimize a service delay to minimize: $T_{max}$.

7. The method for scheduling a mobile edge computing-oriented distributed dedicated protection service according to claim 6, wherein when the integer linear programming optimization model is established with a target of minimizing a service delay, a constraint of the integer linear programming optimization model comprises a service constraint, a MEC server capacity constraint, a delay constraint, and a service protection constraint;

the service constraint comprises: a sum of computing resources required for subservices is equal to resources required for a service, an amount of resources allocated by each server to a subservice on the server is equal to an amount of computing resources that needs to be carried by the subservice, and subservices need to be deployed on different servers for processing;

the MEC server capacity constraint comprises: a total sum of computing resources used on each MEC server cannot exceed a maximum amount of available computing resources of the MEC server;

the delay constraint comprises: a total delay of completing a service cannot exceed a maximum number of time slots; and the service protection constraint comprises: a total sum of computing resources required for a protected subservice is equal to a total sum of computing resources required for a protection subservice, and the protected subservice and the corresponding protection subservice are respectively deployed on different MEC servers.

8. The method for scheduling a mobile edge computing-oriented distributed dedicated protection service according to claim 7, wherein an expression of the service constraint is:

$b_m^{u,k} \geq a_{m,t}^{u,k} \forall u \in U, k \in K_u, m \in E_u, t \in TS$, representing that each subservice k of the service u can only be deployed on one MEC server;

$\Sigma_{k \in K_u} b_m^{u,k} \leq 1 \ \forall u \in U, k \in K_u, m \in E_u$, representing that one MEC server cannot simultaneously serve any two subservices of the service u;

$a_{m1,t1}^{u,k} + a_{m2,t2}^{u,k} \leq 1 \ \forall \in U, k \in K_u, m1, m2 \in E_u, t1, t2 \in TS$, representing that any two subservices of the service u need to be deployed on different servers for processing;

$s_{m,t}^{u,k} \leq \Delta \cdot a_{m,t}^{u,k} \forall u \in U, k \in K_u, m \in E_u, t \in TS$, representing that after the MEC server m provides a computing resource to the subservice k of the service u, the server m is selected as a computing node of the subservice k; and $\Sigma_{k \in K_u} Z_u^k = R_u \ \forall u, \in U, k \in K_u, \Sigma_{m \in r, t \in TS} s_{m,t}^{u,k} = Z_u^k \ \forall u \in U, K_u, m \in E_u, t \in TS$, representing that a total sum of computing resources provided by the server m to the subservice k of the service u is equal to computing resources required for the subservice k, and an amount of computing resources of all subservices k is equal to a required amount of computing resources of the service u;

an expression of the MEC server capacity constraint is:

$\Sigma_{u \in U, k \in K_u} (s_{m,t}^{u,k} + sp_{m,t}^{u,k}) \leq V_m \ \forall u \in U, k \in K_u, m \in E_u, t \in TS$, representing that at any moment t, a sum of computing resources and protection computing resources provided by a MEC server to a subservice cannot exceed a maximum value of available computing resources of the MEC server;

an expression of the delay constraint is:

$T \geq t \cdot a_{m,t}^{u,k} \forall u \in U, k \in K_u, m \in E_u, t \in TS$, representing calculating a time at which all the services have been processed, wherein the time cannot be earlier than an end time of any service in a MEC network; and $T \geq t \cdot ap_{m,t}^{u,k} \forall u \in U, k \in K_u, m \in E_u, t \in TS$, representing calculating a time at which all the services have been processed, wherein the time at which all the services have been processed is not earlier than an end time of any service in the MEC network, comprising a time of service protection; and an expression of the service protection constraint is:

$ap_{m1,t1}^{u,k} + ap_{m2,t2}^{u,k} \leq 1 \ \forall \in U, k \in K_u, m1, m2 \in E_u, t1, t2 \in TS$, $sp_{m,t}^{u,k} \leq \Delta \cdot ap_{m,t}^{u,k} \forall u \in U, k \in K_u, m \in E_u, t \in TS$, representing that none of protection services can be scheduled on the same server as a protected service, and only the same MEC server can provide a computing resource to each protection subservice; and $\Sigma_{k \in K_u} P_u^k = R_u \ \forall_u \in U, k \in K_u, \Sigma_{m \in E, t \in TS} sp_{m,t}^{u,k} = P_u^k \forall u \in U, k \in K_u, m \in E_u, t \in TS$, and $Z_u^k = P_u^k \forall u \in U, k \in K_u$, representing that a protection subservice and a protected subservice have an identical division form.

9. A system for scheduling a mobile edge computing-oriented distributed dedicated protection service, comprising a large-scale network formed by MEC servers, wherein services and dedicated protection services corresponding to the services are arranged on the MEC servers by using the method for scheduling a mobile edge computing-oriented distributed dedicated protection service according to claim 1.

\*     \*     \*     \*     \*